Nov. 15, 1949  C. C. COONS  2,487,791
REFRIGERATION
Filed Aug. 31, 1946  2 Sheets-Sheet 1

INVENTOR.
Curtis C. Coons
BY Harry S. Demaree
ATTORNEY

Patented Nov. 15, 1949

2,487,791

UNITED STATES PATENT OFFICE 2,487,791

REFRIGERATION

Curtis C. Coons, North Canton, Ohio, assignor to The Hoover Company, North Canton, Ohio, a corporation of Ohio Application August 31, 1946, Serial No. 694,371

14 Claims. (Cl. 62—119.5)

This invention relates to the art of refrigeration and more particularly to inert gas type absorption refrigerating machines provided with special constructions for operating an auxiliary or second evaporator at temperature levels sufficiently low to insure long-term preservation of deep frozen foodstuffs, that is, foodstuffs which must be stored at temperatures in the range of five degrees Fahrenheit.

It is a particular object of the present invention to provide an inert gas absorption refrigerating machine in which the low temperatures of the frozen food preserving evaporator are achieved by supplying that evaporator with inert gas which has had its refrigerant vapor content reduced to an extremely low value in an absorber operating at a low temperature.

It is a further object of the present invention to provide an inert gas absorption refrigerating machine in which the absorber for a low temperature evaporator is itself maintained at a relatively low temperature by being refrigerated directly or indirectly by the main load carrying evaporator of the system.

It is a further object of the present invention to provide the low temperature evaporator with a portion of the weak solution discharging from the boiler in the main solution circuit to insure that the low temperature absorber receives the leanest available absorbing solution in the system.

It is a further object of the present invention to provide means by which the proportion of absorbing solution supplied to the low temperature absorber bears an accurately determined relationship to the total quantity of solution circulating per unit of time through the boiler.

It is a further object of the present invention to provide a system in which the solution supplied to the low temperature absorber from the main solution circuit may be augmented by rectifier liquors and/or gas heat exchanger condensate of appropriate refrigerant concentration.

Figure 1:
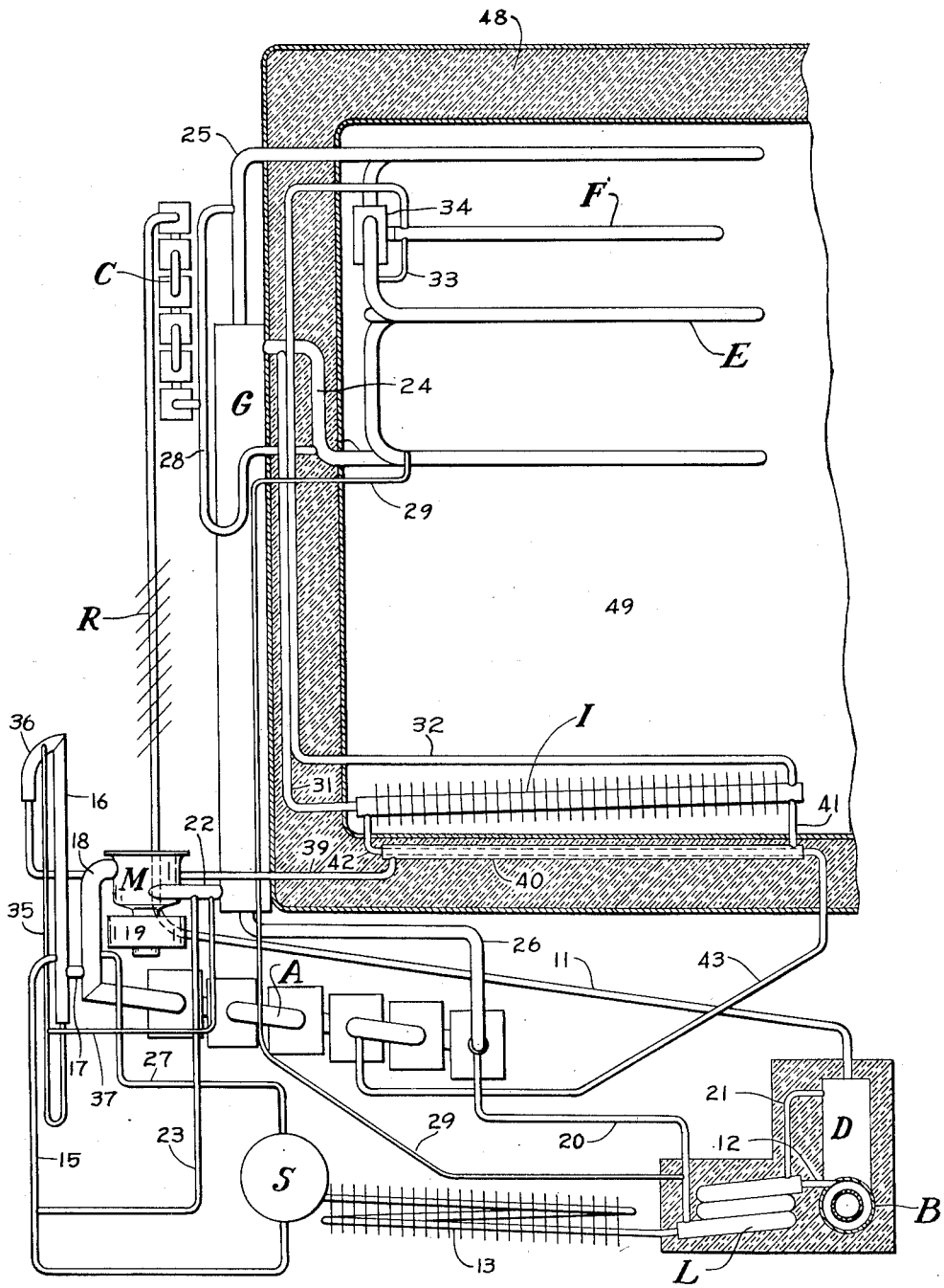
Figure 2:
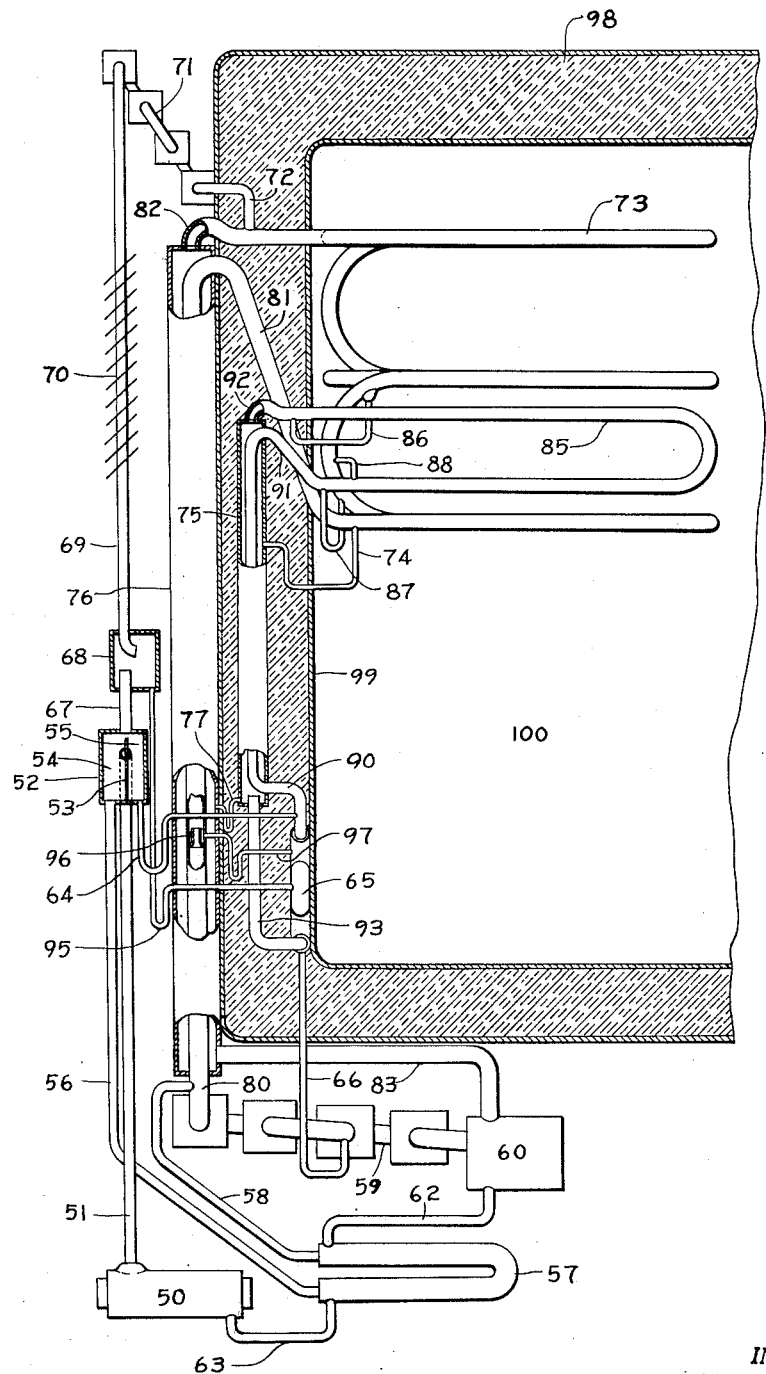

Other objects and advantages of the invention will become apparent as the description proceeds when taken in connection with the accompanying drawing in which:

Figure 1 is a vertical elevational view partly schematic and partly in section of a refrigerating apparatus embodying the present invention; and Figure 2 is a similar view of a modified form of the invention.

Referring now to the drawing in detail and first Figure 1 thereof, there is disclosed a pressure equalized absorption refrigerating system of the type utilizing a power driven element to circulate the inert gas and other fluids in the system. This apparatus will be charged with a suitable refrigerant such as ammonia, an absorbent therefor such as water, and a pressure equalizing gas which is inert with respect to the refrigerant and absorbent such as nitrogen.

A boiler B communicates with an analyzer D in which vapors evolved in the boiler are partially freed of entrained water vapor. The vapors are then conducted through conduit 11 and rectifier R to an air-cooled condenser C.

The lean solution formed in the boiler B is conveyed therefrom to the upper portion of a tubular inclined air-cooled absorber A by means of the conduit 12, liquid heat exchanger L, air-cooled precooling conduit 13, reservoir S, gas lift elevating conduit 15, separating and equalizing chamber 16, conduit 17, and the gas discharge conduit 18 of the absorber which communicates with the suction inlet of a circulating gas propelling pump M which is driven by an hermetically sealed electric motor 19. A portion of the lean solution is removed from the chamber 16 for a purpose to be hereinafter described. The remainder flows downwardly through the absorber A by gravity in counterflow relationship with and in contact with inert gas containing refrigerant vapor. The absorbent absorbs refrigerant from the inert gas and the heat of absorption is rejected to the surrounding atmosphere by the air-cooling fins mounted on the absorber A. The strong solution thus formed in the absorber is returned to the analyzer through conduit 20, liquid heat exchanger L, and conduit 21 thus completing the principal absorbing solution circuit.

A vent conduit 27 is connected between reservoir S and conduit 18 to relieve the reservoir of any gas or vapor evolved therein. The conduit 18 also subjects the reservoir to the lowest pressure in the system, the suction pressure of the gas fan M. The liquid inlet and discharge sides of gas lift pump 15 are therefore held at the lowest system pressure.

The lean inert gas flowing through conduit 18 from absorber A into the gas pump M is placed under pressure and discharged from pump M through conduit 22. A portion of this inert gas is bled off from conduit 22 by conduit 23 which supplies pumping gas to the gas lift pump 15.

The inert gas flowing through conduit 22 passes through the outer passage of the gas heat exchanger G and is conducted by conduit 24 into the bottom portion of the principal evaporator E. This evaporator is of the type in which a propelled stream of the inert gas circulates the refrigerant upwardly through the various convolutions of the evaporator as the refrigerant progressively evaporates into the gas to produce the useful refrigerating effect. The specific construction of this evaporator is disclosed in detail in my copending application Serial No. 694,370, entitled "Refrigeration" and filed August 31, 1946.

The inert gas which has traversed the evaporator E is then conducted to the lower portion of the absorber A by conduit 25, the inner passage of the gas heat exchanger G, and the conduit 26.

The refrigerant vapor supplied to the air-cooled condenser C is condensed to the liquid state therein and discharges from the bottom of the condenser into a conduit 28 which is connected at its upper end to the discharge conduit 25 of the evaporator E to purge the condenser. The lower part of conduit 28 is formed with a U-shaped liquid sealed trap and discharges into the conduit 24 adjacent its point of connection to the evaporator E.

A drain conduit 29 is connected between the upper portion of the lowest convolution of evaporator E and the rich solution return conduit 20 in order to drain the evaporator of excess liquid should liquid accumulate therein to a degree tending to block gas flow.

A portion of the inert gas supplied to conduit 24 is removed therefrom by conduit 31 and is conveyed through an absorber I. The absorber I, as shown, is positioned in the lower portion of the food storage compartment 49 of the refrigerator at which point it will be refrigerated at a temperature in the neighborhood of fifty degrees Fahrenheit by the principal evaporator E. This is, however, a location chosen for illustration, as the absorber I may be positioned in other portions of the food storage compartment of the cabinet or it may be positioned in the insulation thereof and thermally bonded to one of the liner plates of the food storage cabinet.

The inert gas which traverses the absorber I is removed therefrom by conduit 32 and is extremely lean inert gas, that is, the partial pressure of the refrigerant vapor therein contained is at a very low value. The conduit 32 conveys this lean inert gas to one end of the low temperature evaporator F. The evaporator F per se is described and claimed in my copending application Serial No. 694,370, entitled "Refrigeration," filed August 31, 1946, and consists essentially of a U-shaped conduit lying in a horizontal plane between spaced sections of the evaporator E. The end of the evaporator conduit to which the conduit 32 connects is dead-ended and receives liquid refrigerant through a trap sealed conduit 33 which receives liquid from a separation chamber 34 forming part of evaporator E. The chamber 34 is so arranged as to remove the liquid from the gas which liquid then flows through conduit 33 into the evaporator F where it meets the gas stream supplied through conduit 32. The inert gas and liquid refrigerant then traverse the evaporator conduit F and both discharge into the evaporator E. The inert gas which has traversed evaporator F is still comparatively lean as compared with the gas normally circulating through the evaporator E, hence it does not interfere with the effective production of refrigeration in evaporator E at the temperature level for which this evaporator is designed.

A portion of the absorbing solution supplied to the separation chamber 16 by gas lift pump 15 is removed from the bottom thereof by a small gas lift pump conduit 35 which discharges into a separation chamber 36 in open communication with the upper end of separation chamber 16. Pumping gas is supplied to the conduit 35 by a conduit 37 which connects to the gas discharge conduit 22 of the gas circulating fan F. The liquid discharged into chamber 36 is conveyed through a conduit 39, the liquid heat exchanger 40, and conduit 41 to the upper end of the low temperature absorber I. This solution is at the lowest absorbing solution concentration found in the system, hence it is able substantially to strip the inert gas in absorber I at the low temperatures at which this absorber is maintained. The chamber 16 is open to the suction inlet of gas pump N and is therefore at a lower pressure than the solution inlet to the absorber I which is at a somewhat higher gas pressure. The foregoing pressure differential is balanced by a liquid column in conduit 39 above the junction of conduit 41 with absorber I. The solution flows by gravity through absorber I and is conveyed therefrom to the absorber A by conduit 42, the liquid heat exchanger 40, and conduit 43. The conduit 43 opens into the absorber A at a point at which the solution flowing therethrough has substantially reached the concentration of the absorbing solution discharging from the absorber I.

The present system comprises an inert gas type absorption refrigerating system using positive propulsion of the inert gas and liquids in the system in which a part of the lean absorbing solution is removed from the solution circuit through a metering gas lift pump and supplied to a low temperature absorber through which it flows in contact with and in counterflow relationship with inert gas removed from the lean gas conduit connecting to the evaporator. In this circuit the absorbing solution is partially enriched and is returned to the absorber, whereas the gas, substantially stripped of refrigerant vapor content, is then conducted to the low temperature evaporator in which it comes in contact with liquid refrigerant withdrawn from the main evaporator to produce temperatures sufficiently low to preserve deep frozen foodstuffs.

The conduits 31 and 32, as indicated, may be arranged in heat exchange relationship in order to improve the economy of the system.

The cabinet construction is only partially indicated and includes an insulated wall structure 48 enclosing a food preserving compartment 49 which encases the evaporators E and F and the low temperature absorber I.

This form of the invention has been found by test to give very satisfactory results and produce stable low temperature conditions in the evaporator F, which as pointed out in the aforesaid copending application is encased within a heavily insulated low temperature refrigerating chamber, sufficient to preserve frozen foodstuffs. The gas lift pump arrangement 35 has a much smaller capacity than the principal gas lift pump 15, as the secondary absorber I requires only a small proportion of solution as compared to the principal absorber. It is characteristic of these systems that the temperatures must be maintained at very low values; however, the load is small because of the heavily insulated compartment encasing the evaporator F and because of the fact that the foodstuffs are normally placed in that compartment in very cold condition and need only be maintained at the low temperature desired.

Referring now to Figure 2, there is disclosed a modified form of the invention by which the principles thereof may be applied to an absorption refrigerating system of the type in which fluid circulation occurs by gravity and by a heat operated pump. In addition, this form of the system discloses various means by which the solution supplied to the secondary absorber may be augmented from other sources within the system. The refrigerating system of Figure 2 will be charged similarly to the system of Figure 1 except that the inert gas should be materially lighter than the refrigerant, hence hydrogen is preferred as an inert pressure equalizing medium in this system.

The application of heat to the boiler 50 will cause evolution of refrigerant vapor from the solution therein contained. The vapor so formed will elevate solution through the vapor lift conduit 51 into a separation chamber 52 which is interiorly divided by a partition 53 arranged across the discharge of the conduit 51 so as to split the solution into a major portion falling into chamber 54 and a minor portion falling into chamber 55. That portion of the solution which discharges into the chamber 54 is removed therefrom by conduit 56, liquid heat exchanger 57, and conduit 58 which discharges into the upper end of an inclined tubular air-cooled absorber 59. This solution flows downwardly through the absorber by gravity in counterflow relationship to inert gas and absorbs refrigerant vapor therefrom. The resulting enriched solution then discharges into the solution reservoir 60 from which point it is returned to the generator 50 by conduit 62, the liquid heat exchanger 57, and conduit 63.

The minor portion of the solution discharging through conduit 51 is conveyed through conduit 64, which includes a U-shaped gas sealing liquid trap, into the upper portion of a low temperature absorber 65. This solution flows downwardly through the absorber 65 in contact with inert gas from which it absorbs refrigerant. The resultant partially strengthened solution is then returned through the conduit 66 to the absorber 59, where it rejoins the principal solution circuit at a point where the solution concentration is approximately that of the solution flowing through conduit 66.

The refrigerant vapor discharging into chamber 52 through conduit 51 is conveyed therefrom to a condenser 71 by conduit 67, chamber 68, conduit 69, and rectifier 70. The vapor reaching condenser 71 is condensed therein in heat exchange relationship with atmospheric air and is conducted from this condenser through conduit 72 to the upper portion of an evaporator 73.

The liquid refrigerant flows downwardly through the evaporator 73 in contact with and in counterflow relationship with inert gas into which it evaporates to produce the refrigerating effect. Unevaporated liquid materials reaching the lowermost portion of evaporator 73 are conveyed therefrom through a U-shaped liquid sealing conduit 74 into the outer passage of a gas heat exchanger 75. These liquids are then drained from the gas heat exchanger 75 into the outer passage of a gas heat exchanger 76 by means of a U-shaped gas sealing trap conduit 77. The liquids then are returned to the absorbing solution circuit through the gas conduit 83 which connects to the outer passage of gas heat exchanger 76.

Lean inert gas is conveyed from the absorber to the lower portion of the evaporator 73 through conduit 80, the inner passage of the gas heat exchanger 76, and conduit 81. The gas then flows upwardly through the evaporator in contact with the liquid, as heretofore described, and is conveyed from the evaporator to the absorber 59 by means of conduit 82, the outer passage of the gas heat exchanger 76, conduit 83, and reservoir 60. This completes the main inert gas circuit.

A low temperature evaporator 85 and the low temperature absorber 65 are connected to form an inert gas circuit which is separate from the principal inert gas circuit immediately above described. The evaporator 85 is shown as a U-shaped vertical coil in this figure for convenience of illustration. It will be positioned within an insulated low temperature chamber which is housed within the food storage chamber of the refrigerator cabinet. This conduit may be substantially horizontal if desired. Liquid is supplied to the evaporator 85 by a U-shaped drain conduit 86 which removes liquid from the evaporator 73 after it has traversed the two upper horizontal sections thereof. The liquid flows through the evaporator conduit 85 and is then returned to the evaporator E just above the lowest horizontal section thereof by the U-shaped conduit 87, hence the liquid is removed from the evaporator 73 only for the extent of one of the short vertical riser conduits.

Inert gas in the system comprising the absorber 65 and evaporator 85 flows upwardly through the absorber 65 and is conveyed therefrom to the lower part of evaporator 85 by conduit 90, the inner passage of gas heat exchanger 75, and conduit 91. After traversing evaporator 85 the inert gas is returned to the lower portion of absorber 65 by conduit 92, the outer passage of the gas heat exchanger 75, and conduit 93, thus completing the second inert gas circuit. A vent conduit 88 between evaporators 73 and 85 serves to equalize pressures in the two inert gas circuits.

In addition to the lean absorbing solution supplied to absorber 65 through conduit 64, liquid condensed in the rectifier 70 drains into the vessel 68 from which point it is conducted by the liquid sealed conduit 95 into the absorber 65 at approximately the midpoint thereof. The rectifier solution is brought into the absorber below the point at which solution from the generator is supplied thereto as the rectifier solution contains a somewhat higher refrigerant concentration.

An additional source of solution is the inner passageway of the main gas heat exchanger 76. A certain amount of liquid condenses in the inner passage of gas heat exchangers in apparatuses of this type and has a concentration range such that it is suitable for use in a low temperature absorber of the type contemplated in the instant invention. For this purpose the inner passage of the gas heat exchanger is provided with a gas passing, liquid trapping element 96 arranged to entrap liquid condensed in the upper portion of the heat exchanger. The liquid entrapped by the element 96 is conducted into the absorber 65 between the points at which it receives solution from the generator and the rectifier by a trap sealed conduit 97.

The solution diverted from the main solution circuit is the leanest solution and hence most effectively strips the inert gas. However, the gas heat exchanger and rectifier liquids are sufficiently low in refrigerant vapor concentration effectively to participate in the absorbing process in the low temperature absorber. In the arangement as shown in Figure 2 the absorbing solution in the generator performs a final stripping function and the solutions from the rectifier and gas heat exchanger together with solution from the generator, which has been partially enriched in the final stripping operation, perform the bulk of the absorbing process in absorber 65.

A cabinet construction is indicated at 98 having insulated walls with an inner liner 99 defining a food storage chamber 100. The absorber 65 constitutes a sinuous conduit, as shown, positioned in the insulation of the cabinet structure 98 and in thermal transfer relationship with the inner liner 99 whereby this absorber is cooled directly by the cold air within the food storage compartment 100 and ultimately by the principal evaporator 73. Hence the absorber 65 operates at temperatures in the range of fifty degrees Fahrenheit.

The arrangement of the drain conduits 74 and 77 is important. By draining solution from the main evaporator through the portions of each heat exchanger which are connected to the upper gas outlet portions of the evaporators, the correct direction of flow of inert gas is assured. It sometimes occurs when starting the apparatus that the inert gas will tend to flow in a reverse direction. Evaporation in the heat exchangers of portions of the liquid drained through conduits 74 and 77 creates heavy columns in the outer passage of the heat exchanger which assure correct flow of the inert gas in both circuits.

Though three sources of solution for the low temperature absorber 65 have been illustrated, either or both the rectifier and gas heat exchanger sources may be omitted. The arrangement shown would provide a comparatively high capacity for the evaporator 85. However, for smaller sized units either or both the rectifier and gas heat exchanger sources of solution may be omitted and entire reliance placed upon the lean solution supplied from the generator through the conduit 64.

Both forms of the invention herein disclosed produce low temperatures by diverting a small proportion of the lean solution discharging from the boiler assembly to a low temperature absorber which is ultimately cooled by the main evaporator of the system so that it can effectively strip inert gas flowing to a very low temperature evaporator. By reason of the extremely low refrigerant vapor content of the inert gas flowing to the low temperature evaporators, the refrigerant will evaporate thereinto under conditions such that the desired temperatures can be maintained. Since the solution which has traversed the low temperature absorber is still comparatively lean, the same is returned to the principal absorber at approximately the point at which the solution in the principal absorber has reached a concentration equal to that discharging from the low temperature absorber. Hence this liquid can further participate in the absorbing process in the main absorber and will be enriched to the same degree as the solution which has traversed the entire principal absorber. As a further advantage the liquid discharging from the low temperature absorber may be utilized to cool solution flowing to that absorber, as in the Figure 1 form of the invention, or the cold solution may be run directly to the principal absorber, as illustrated in the Figure 2 form of the invention. In either event an appreciable economy in the system accrues because of the effective cooling powers of the solution discharged from the low temperature absorber.

The load carried by the low temperature portions of the system is comparatively low. Therefore the quantity of absorbing solution supplied to the low temperature absorber from the generator is only a small proportion of the amount of absorbing solution which is supplied to the principal air cooled absorber. The exact proportions of the solution supplied to each absorber will vary with different designs, that is, the relative capacities of the very low and higher temperature refrigerating sections of the apparatus. It has been found, for example, that an eight cubic foot standard refrigerator modified to incorporate a one cubic foot low temperature chamber gives satisfactory performance with a solution flow of approximately 300 to 350 cubic centimeters per hour to the low temperature absorber and approximately three and one-half liters per hour to the primary air cooled absorber.

While only two embodiments of the invention have been shown and described herein, it is apparent that various changes may be made in the arrangement and construction of parts without departing from the spirit of the invention or the scope of the annexed claims.

I claim:

1. Absorption refrigerating apparatus of the pressure equalized type including first and second evaporators, a first absorber arranged to be cooled by said first evaporator, a second absorber, a generator, means for condensing refrigerant vapor evolved in said generator and for supplying refrigerant liquid to said evaporators, inert gas conducting means for conveying inert gas from said first and second absorbers to said second and first evaporators respectively, means for withdrawing weak absorbing liquid from said generator and for dividing the withdrawn liquid into two streams, and means for conveying each of said streams of absorbing liquid to separate ones of said absorbers in parallel.

2. Absorption refrigerating apparatus of the pressure equalized type including first and second evaporators, a first absorber arranged to be cooled by said first evaporator, a second absorber, a generator, means for condensing refrigerant vapor evolved in said generator and for supplying refrigerant liquid to said evaporators, inert gas conducting means for conveying inert gas from said first and second absorbers to said second and first evaporators respectively, means for withdrawing weak absorbing liquid from said generator and for dividing the withdrawn liquid into two streams, means for conveying each of said streams of absorbing liquid to separate ones of said absorbers in parallel, and means for conducting absorbing liquid which has traversed said first absorber to said second absorber intermediate the ends of the path of liquid flow therethrough.

3. Absorption refrigerating apparatus of the pressure equalized type including first and second evaporators, a first absorber arranged to be cooled by said first evaporator, a second absorber, a generator, means for condensing refrigerant vapor evolved in said generator and for supplying refrigerant liquid to said evaporators, inert gas conducting means for conveying inert gas from said first and second absorbers to said second and first evaporators respectively, pumping means for conducting absorbing solution from said generator in parallel to each of said absorbers, and means for returning solution which has traversed said absorbers to said generator.

4. Absorption refrigerating apparatus of the pressure equalized type including first and second evaporators, a first absorber arranged to be cooled by said first evaporator, a second absorber, a generator, means for condensing refrigerant vapor evolved in said generator and for supplying refrigerant liquid to said evaporators, inert gas conducting means for conveying inert gas from said first and second absorbers to said second and first evaporators respectively, and means for dividing weak absorbing solution from said generator into major and minor portions and for supplying said major portion to said second absorber and for supplying said minor portion to said first absorber.

5. Absorption refrigerating apparatus of the pressure equalized type including a cooling structure having a main evaporator and a low temperature evaporator, a low temperature absorber arranged to be cooled by said main evaporator, a main absorber, means including a gas heat exchanger connecting said main absorber and said main evaporator to provide a circuit for inert gas, means for liquefying refrigerant vapor evolved in said generator and for supplying the liquefied refrigerant to said cooling structure, means for draining condensate formed in said gas heat exchanger into said low temperature absorber, and means for flowing inert gas through said low temperature absorber and for flowing the inert gas which has traversed said low temperature absorbed through said low temperature evaporator.

6. Absorption refrigerating apparatus including a cooling assembly having a low temperature evaporator part and a higher temperature evaporator part, a first absorber arranged to reject heat of absorption to a part of said evaporator assembly, a second absorber, means connecting said higher temperature evaporator part and said second absorber to form an inert gas circuit, power operator means for circulating inert gas through said circuit, means arranged to conduit a portion of the inert gas flowing to said higher temperature evaporator part through said first absorber and said low temperature evaporator part and for returning inert gas which has traversed said low temperature evaporator to said inert gas circuit, means providing a circuit for absorbing solution including said absorbers and a generator including gas lift pump means arranged to elevate weak absorbing solution from said generator to a level from which it may flow to said second absorber by gravity, gas lift pump means for conducting a portion of the solution elevated in said first-mentioned gas lift pump means into said first absorber, and means for supplying pumping gas placed under pressure by said power operated means to said gas lift pump means.

7. Refrigerating apparatus comprising a cabinet structure including an insulated refrigerating chamber having an inner wall of heat conducting material and a mechanism chamber, an absorption refrigerating apparatus of the pressure equalized type associated with said cabinet structure including an evaporator in said refrigerating chamber and an absorber in said mechanism chamber, a low temperature evaporator in said refrigerating chamber, a second absorber embedded in the insulation of said refrigerating chamber and in heat exchange relation with said liner, means for supplying absorbing liquid to said second absorber, means for supplying refrigerant liquid to said low temperature evaporator, means for supplying inert gas to said second absorber, and means for supplying stripped inert gas to said low temperature evaporator from said second absorber.

8. Refrigerating apparatus including an insulated food preserving chamber, an evaporator arranged to refrigerate said food preserving chamber, a low temperature evaporator, an air-cooled absorber positioned exteriorly of said chamber, an absorber positioned exteriorly of said chamber arranged to be refrigerated by said first-mentioned evaporator, means for supplying refrigerant liquid to said evaporators, means for supplying absorbing solution to said absorbers, means for conveying inert gas which has had its refrigerant vapor content reduced in said air-cooled absorber to said first-mentioned evaporator and means for conveying inert gas which has had its refrigerant vapor content reduced in said second-mentioned absorber to said second-mentioned evaporator.

9. Absorption refrigerating apparatus including a first evaporator and a first absorber connected for gravity actuated circulation of inert gas therebetween, a second evaporator and a second absorber connected for gravity actuated circulation of inert gas therebetween, said apparatus being so constructed and arranged that heat of absorption rejected by said second absorber is absorbed by said first evaporator, a generator, means for liquefying refrigerant vapor produced in said generator and for supplying refrigerant liquid to said evaporators, means for circulating absorbing solution in a circuit including said generator and said absorbers so arranged that lean solution withdrawn from said generator is separated into two portions each of which is supplied to one of said absorbers.

10. Absorption refrigerating apparatus including a first evaporator and a first absorber connected for gravity actuated circulation of inert gas therebetween, a second evaporator and a second absorber connected for gravity actuated circulation of inert gas therebetween, said apparatus being so constructed and arranged that heat of absorption rejected by said second absorber is absorbed by said first evaporator, a generator, means for liquifying refrigerant vapor produced in said generator and for supplying refrigerant liquid to said evaporators, means for circulating absorbing solution in a circuit including said generator and said absorbers including a vapor lift pump conduit connected to receive lean absorbing solution and pumping vapor from said generator, dividing means connected to receive absorbing solution from said vapor lift pump and to divide such solution into two bodies, and means for conducting one body of solution from said dividing means to said first absorber and another body of solution to said second absorber.

11. That improvement in the art of refrigeration which includes applying heat to a solution of refrigerant in an absorbent to evolve refrigerant vapor and to form a weak absorbing solution, conducting a portion of such weak solution into contact with a mixture of refrigerant vapor and inert gas to absorb refrigerant vapor from the mixture and to produce lean inert gas, conducting such lean inert gas into contact with refrigerant liquid formed by condensing vapor evolved by heating said solution of refrigerant in absorbent to produce a refrigerating effect by evaporation of said refrigerant liquid, conducting another portion of such lean solution into contact with inert gas in heat transfer relationship with said evaporating refrigerant liquid to absorb refrigerant vapor and to produce lean inert gas, conducting said last-mentioned lean inert gas into contact with refrigerant liquid to produce a second refrigerating effect by evaporation of said refrigerant liquid.

12. That improvement in the art of refrigeration which includes applying heat to a solution of refrigerant in an absorbent to evolve refrigerant vapor and to form a weak absorbing solution, conducting a portion of such weak solution into contact with a mixture of refrigerant vapor and inert gas to absorb refrigerant vapor from the mixture and to produce lean inert gas, conducting such lean inert gas into contact with refrigerant liquid formed by condensing vapor evolved by heating said solution of refrigerant in absorbent to produce a refrigerating effect by evaporation of said refrigerant liquid, conducting another portion of such lean solution into contact with inert gas in heat transfer relationship with said evaporating refrigerant liquid to absorb refrigerant vapor and to produce lean inert gas, conducting absorbing solution enriched by absorbing refrigerant vapor in heat exchange relationship with evaporating refrigerant liquid into contact with inert gas and refrigerant vapor contacting said first-mentioned portion of weak absorbing solution, conducting said last-mentioned lean inert gas into contact with refrigerant liquid to produce a second refrigerating effect by evaporation of said refrigerant liquid.

13. Absorption refrigerating apparatus comprising first and second evaporators, first and second absorbers, a generator assembly, a rectifier connected to receive vapor from said generator assembly, a condenser connected to receive vapor from said rectifier, means for conducting refrigerant liquid from said condenser to said evaporators, means for conducting weak absorbing solution from said generator assembly to said absorbers, means for conducting lean inert gas from said first absorber to said first evaporator, means for conducting condensate from said rectifier to said second absorber, and means for conducting lean inert gas from said second absorber to said second evaporator.

14. Refrigerating apparatus including first and second evaporators, first and second absorbers, a generator assembly, a conduit connected to receive refrigerant vapor from said generator assembly and to supply refrigerant liquid to said evaporators, means providing a circuit for inert gas between said first evaporator and said first absorber including gas propulsion means arranged to place the inert gas under pressure in a portion of said circuit to cause flow of the inert gas, gas lift pump means for withdrawing lean absorbing solution from said generator and for supplying such lean absorbing solution to said absorbers, means for supplying said gas lift pump means with pumping gas placed under pressure by said gas propulsion means, and means for withdrawing a portion of the inert gas flowing in said inert gas circuit from said first absorber to said first evaporator, flowing the withdrawn inert gas through said second absorber and said second evaporator respectively and then returning the withdrawn inert gas to said inert gas circuit.

CURTIS C. COONS.

REFERENCES CITED

The following references are of record in the file of this patent:

UNITED STATES PATENTS

| Number | Name | Date |
|---|---|---|
| 1,711,553 | Von Platen et al. | May 7, 1929 |

FOREIGN PATENTS

| Number | Country | Date |
|---|---|---|
| 317,052 | Great Britain | Nov. 6, 1930 |